United States Patent [19]

Mordarski et al.

[11] Patent Number: 4,578,237

[45] Date of Patent: Mar. 25, 1986

[54] NONDESTRUCTIVE DETERMINATION OF NUCLEAR FUEL BURNUP

[75] Inventors: Walter J. Mordarski, Wallingford; Jan Markiewicz, North Haven, both of Conn.

[73] Assignee: Combustion Engineering, Inc., Windsor, Conn.

[21] Appl. No.: 530,458

[22] Filed: Sep. 9, 1983

[51] Int. Cl.⁴ .............................................. G21C 17/00
[52] U.S. Cl. ..................................... 376/154; 376/257
[58] Field of Search ............... 376/154, 257, 159, 254, 376/255, 257

[56] References Cited

U.S. PATENT DOCUMENTS 4,229,654 10/1980 Arya et al. ........................... 376/257
4,325,785 4/1982 Klotz et al. ......................... 376/154
4,510,117 4/1985 Philips et al. ........................ 376/257

Primary Examiner—Salvatore Cangialosi
Attorney, Agent, or Firm—L. James Ristas

[57] ABSTRACT

An apparatus (10, 110, 210) including a containment capsule (12, 112, 212) a support member (16, 116, 216) removably disposed within the capsule and carrying therein a solid state track recorder material (20, 120, 220) and a layer of fissile material (20, 120, 220), and means (52) on the exterior of the capsule adapted to be remotely grasped for positioning the capsule adjacent to the fuel. The capsule is lowered into close proximity to the fuel, and positioned at a predetermined location for a period of time between about one hour and one day. The capsule is withdrawn from the fuel, the support member and recording member are withdrawn from the capsule, and the recording member is processed to reveal the fission track density, which is readily correlated to fuel burnup.

15 Claims, 7 Drawing Figures

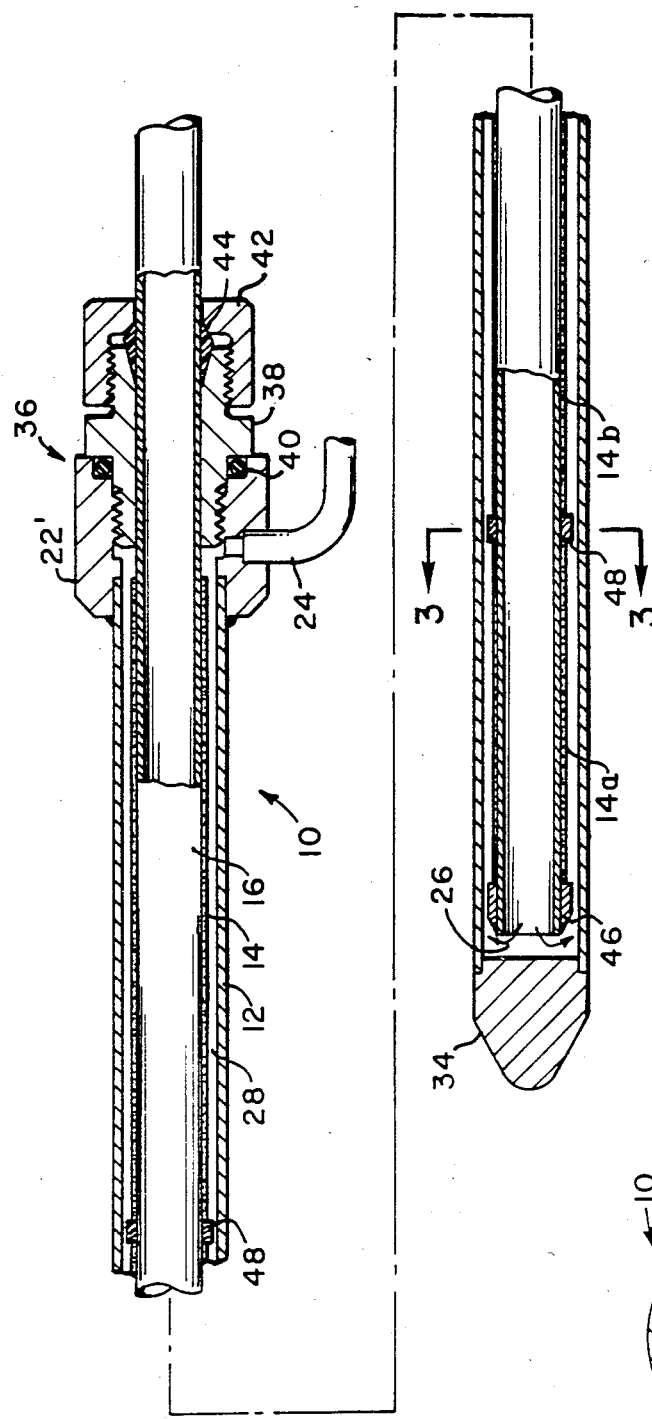
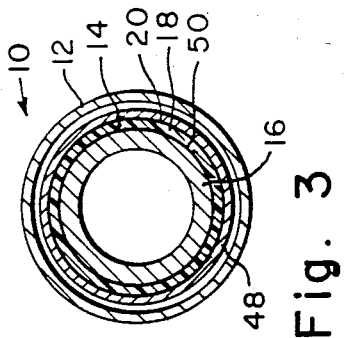
Fig. 2
Fig. 3

NONDESTRUCTIVE DETERMINATION OF NUCLEAR FUEL BURNUP

BACKGROUND OF THE INVENTION

The present invention relates to a nondestructive testing method and apparatus for determining burnup in nuclear fuel rods and assemblies.

Accurate knowledge of fuel burnup and fuel burnup distribution in nuclear fuel assemblies is necessary to manage refueling and reactor operation for optimum plant performance. Average core burnup can be obtained quite accurately from calculations based on power output. Calculation of local burnup in specific fuel rods or assemblies is more difficult and uncertain because local burnup can be influenced by conditions that change the local neutron flux energy distribution or the local temperature. These changes arise from a variety of conditions such as bowing of fuel rods or fuel assemblies, coolant flow restrictions or crud deposition in localized areas on the fuel cladding. Accurate determination of local burnup can serve to determine the proper fuel assembly relocation during refueling to maximize energy extraction from the fuel, and it can also serve to reveal incipient problems which may not as yet have been detected by other means.

Mass spectrometric isotopic analysis is the traditional and highly accurate method for fuel burnup measurement. Unfortunately this is a destructive method that requires the removal of a fuel rod (or rods) from a fuel assembly and shipment to a hot cell facility for isotopic analysis. The method is expensive and time consuming. The results of the analysis cannot be available soon enough for corrective action during a refueling cycle.

Nondestructive burnup determination can be made by a measurement of specific radiation that continues to be emitted from a fuel assembly after removal from the reactor. This radiation can be directly related to the quantity of a specific fission product that is present and through this relation to the quantity of material fissioned (burnup). It is possible to make such measurements on two forms of radiation-gamma and neutron. Gamma ray measurement requires the use of a multichannel gamma ray electronic analyzer and time and personnel at the examination site to make the measurements. Simultaneous analysis of many fuel rod locations becomes difficult and the time required to perform their measurements may affect the critical path on the refueling outage schedule. Measurement of spontaneous neutron flux has similar problems.

Detectors utilizing solid state track recorders, have been built and used to measure non-destructively the actinide content (plutonium, neptunium, curiuml in aged spent fuel assemblies, approximately three years after removal from the reactor. When fission fragments, protons or alpha particles impinge on certain materials commonly called solid state track recorders (SSTR) such as mica, and other materials, they leave well defined sub-microscopic tracks or craters in the surface of the material from which the nature and abundance of the incident irradiation can be determined.

The foregoing fuel burnup determination techniques suffer from one or more disadvantages in that they are either destructive, too complex or time consuming for use on site during refueling, requiring a laboratory environment, or requiring aging of the spent fuel to reduce radioactivity levels prior to characterization.

SUMMARY OF THE INVENTION

The present invention extends the application of solid state track recorder devices to burnup determination in freshly irradiated fuel assemblies. The inventive method and device are based on a passive technique that can be implemented as part of a reactor pool side inspection on freshly irradiated fuel. Thus measurements can be made during a normal reactor refueling operation and the fuel reinserted for further irradiation. Such burnup evaluations are of special importance in situations where anomalies in fuel performance are observed or where the interim data are desired on new fuel design, test rods, or assemblies.

The present invention provides a method and apparatus for nondestructive, passive measurement of the neutron flux produced by the nuclear fuel to be examined. The quantity of plutonium generated in a specific nuclear reactor is directly related to the fuel burnup. Several of the plutonium isotopes fission spontaneously and emit neutrons in the process. These spontaneous fission events go on for a very long time even after the fuel is removed from a reactor. In the present invention, a fissionable material is placed in a region where such neutron emission is present. Fission events will occur in this material at a rate that is proportional to the quantity of fissionable material present and to the intensity of the neutron flux.

The fissionable material is deposited as a thin layer or coating on a layer of material know as solid state track recorders (SSTR), whereon each fission event will produce fragments which cause sub-microscopic damage, or tracks in the SSTR material. These sub-microscopic tracks can be enlarged and made visible under a microscope after removal from the probe, by etching in the manner similar to that by which a dye penetrant makes microscopic tracks visible on metal surfaces. An optical microscope is used to count the number of tracks per unit of area on the film. This count is related to the neutron flux, from which the quantity of plutonium in the fuel and consequently the fuel burnup, is determined.

The invention is more specifically directed to an apparatus including a containment capsule, a support member removably disposed within the capsule and carrying therein a solid state track recorder material and a layer of fissile material, and means on the exterior of the capsule adapted to be remotely grasped for positioning the capsule adjacent to the fuel.

One embodiment includes an elongated generally cylindrical metal containment tube, a central support tube removably supported within and substantially coextensive with the tube, and a generally cylindrical recording member carried by and surrounding the support tube.

According to the method of the invention, the fuel is removed from the nuclear reactor and located in an area accessible from above, a measurement apparatus of the type described immediately above is lowered into close proximity to the fuel, and positioned at a predetermined location for a period of time between about one hour and one day. The capsule is withdrawn from the fuel, the support member and recording member are withdrawn from the capsule, and the recording member is processed to reveal the fission track density.

BRIEF DESCRIPTION OF THE DRAWINGS

A complete description of the preferred embodiments of the invention is set forth below in conjunction with the accompanying drawings in which:

FIG. 2 is a detailed view of the probe depicted in FIG. 1;

FIG. 3 is a cross-section of the probe, along lines 3—3 of FIG. 2;

DESCRIPTION OF THE PREFERRED EMBODIMENTS

In one embodiment of the invention, an elongated probe is used to characterize the burnup of a nuclear fuel assembly. A typical fuel assembly contains an array of approximately 200 fuel rods and, within this array, one or more guide tubes are provided for inserting control rods or instruments into the assembly during operation of the reactor. During refueling, fuel assemblies are removed from the reactor and placed in temporary storage in a refueling pool. In the pool, the assemblies are typically under 30 to 40 feet of water. It is in the fuel pool where the present invention would be utilized to characterize the burnup of the assembly. Typical fuel assemblies and their transfer to the fuel pool during reactor refueling, are described in U.S. Pat. No. 4,325,785, "Method and Apparatus for Measuring the Reactivity of a Spent Fuel Assembly", which is hereby incorporated by reference. Under some circumstances, however, the burnup determination might be made in air.

Figure 1:
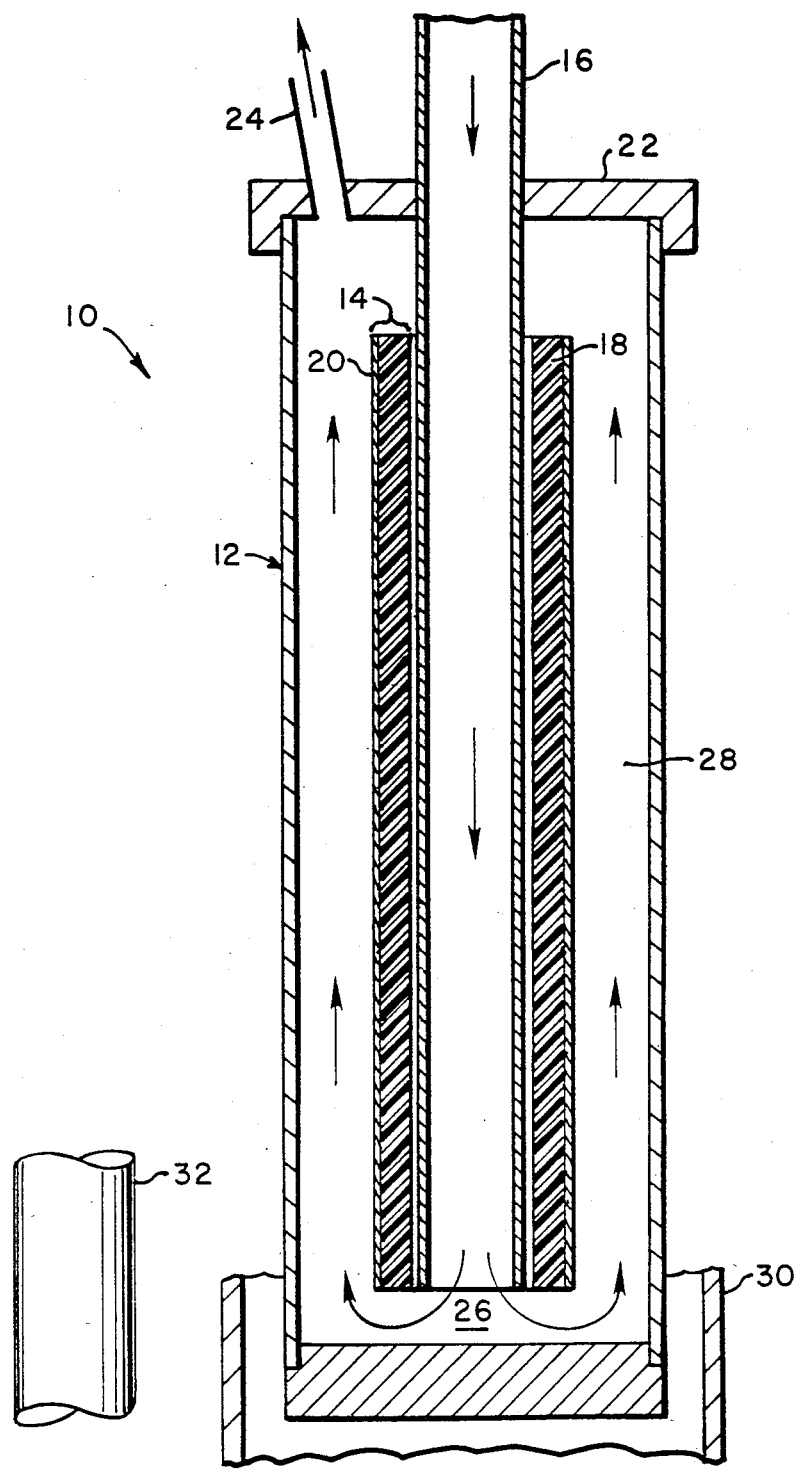
FIG. 1 is a schematic representation of the embodiment of the invention adapted for insertion within a guide tube of a nuclear fuel assembly for determining fuel assembly burnup characteristics.

FIG. 1 shows schematically a probe according to the invention, for use in the burnup characterization of such a fuel assembly. The probe 10 includes a containment capsule 12 in which is disposed a recording member 14 carried by a support tube 16. The recording member 14 has a layer of SSTR material 18 on which has been deposited a coating or layer 20 of fissile material. Suitable SSTR materials 18 include mica, Macrofol, and several types of allyl diglycol carbonate, cross-linked monomers such as that commonly known as CR-39. See, for example, "Track-Recording Solids", by Steven T. Allen, et al., *Physics Today*, September 1981, p. 32—39, and references cited therein, for additional information regarding the type of materials suitable for SSTR and the processing required to interpret the tracks produced thereon. Suitable fissile materials include $U^{235}$, $U^{238}$, $Np^{237}$, and $TH^{232}$. The fissile coating 20 can alternatively be carried on the inside surface of a thin metal foil such as stainless steel (not shown), covering the layer of SSTR 18. The SSTR 18 can be fabricated in tubular form in a thickness sufficient to be self-supporting, in which case a separate support tube 16 is not needed. However the probe is configured, the fissile coating 20 must be adjacent to the SSTR material 18.

The capsule 12 is sealed with an end cap 22 and connected to a source of coolant (see FIG. 2) such that preferably a gas coolant is introduced through the support tube 16, passes down the probe into an end plenum 26 and up along the flow annulus 28, through the outlet 24. Cooling of the probe would normally be required when the probe is installed or inserted within the fuel assembly guide tube 30 in the presence of a plurality of fuel rods 32 and the surrounding medium provides a relatively poor heat sink, e.g., air. Neutrons from the nuclear fuel 32 impinge upon the fissile coating 20 causing fission, and the resulting fission products impinge upon the SSTR material. The resulting tracks are analyzed for a determination of the fuel assembly burnup.

FIGS. 2 and 3 show the preferred embodiment of the assembly probe in greater detail. The probe 10 has the cylindrical containment capsule 12, cylindrical recording member 14, and support tube 16, substantially as shown in FIGS. 1 and 2. The probe is sealed at its lower end with end plug 34 and at the upper end with removal seal assembly 36. Seal assembly 36 may take various forms, the illustrated form including a seal plug 22' welded to the capsule 12 and including a path for the coolant outlet 24. A tube fitting 38 threadingly engages the internal bore of the seal plug 22' and is sealed thereagainst by O rings 40. A nut 42 with a nylon ferrule 44 is then drawn down against tube fitting 38 to complete the seal. With this arrangement, the tube fitting 38 and nut 42 can be removed such that the support tube 16 and recording member 14 can be withdrawn from the capsule 12. Retaining ring 46 is provided at the bottom of the support tube 16, having a larger diameter than the outer diameter of the recording member 14. The probe can be handled by grasping the capsule 12 or the seal assembly 36 connected thereto.

In the illustrated embodiment, recording member 14 is axially segmented and each segment such as 14a, 14b, is separated and supported by spacer rings 48 having substantially the same outer diameter as the retaining ring 46. When used in a typical nuclear fuel assembly having an active fuel length over 10 feet, the segmenting of the recording member 14 provides more conveniently sized pieces to be analyzed. Furthermore, alternating segments of different fissile materials can be placed axially along the support tube 16, if a profile of the incident neutron energy spectrum is desired.

In the preferred embodiment, it is desired that the source of neutrons impinging upon the fissionable material be limited to fuel rods in the direct line of sight to the location where the respective track is produced on the SSTR material. To provide this feature, the support tube 16 can be coated with a poison material such as gadolinium 50, which has a high absorption cross-section for thermal neutrons, such as shown in FIG. 3.

The inventive method includes the steps of remotely grasping the exterior of the probe by any suitable means, inserting the probe 10 into the guide tube 30 of a fuel assembly, and recording the time of insertion. The probe remains in the assembly for a period anywhere from one hour to one day or longer in duration, depending on capsule construction and examination schedule convenience. It should be appreciated that a plurality of probes 10 can be inserted into a plurality of fuel assemblies at one time, and all removed together at a later time. Or insertion and removal can be at different times and for different durations. Only a record of the time period of insertion is needed. Upon removal of a probe from a fuel assembly, the probe is opened, as described above, and the recording member 14 is removed from the capsule and processed. The radioactivity resulting from the relatively small number of fission events produced in the recording member 14 is negligible, and since a hot cell and remote handling facilities are not required, the analysis can be done at the plant site.

Processing of the recording member 14 would typically include disolving and washing away of the fissile coating 20 with a mild nitric acid solution followed by an etching of the SSTR layer 18 with a sodium hydroxide solution to enhance the visibility of the fission tracks. The etched SSTR layer 18 is placed in an optical microscope and the number of tracks per unit area is counted. This information is then used to calculate the neutron flux from which the quantity of plutonium present and the fuel burnup in the region are determined.

Figure 4A:
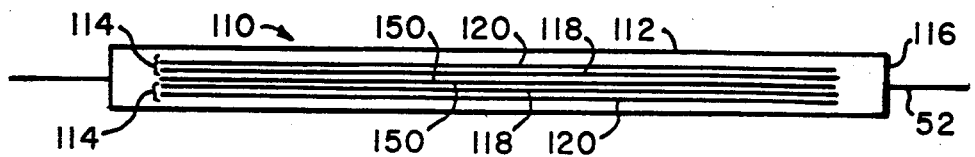
FIGS. 4a,b, and c are schematic representations of an alternative embodiment of the invention, suitable for measuring burnup of an individual fuel rod within a fuel assembly.
Figure 4B:
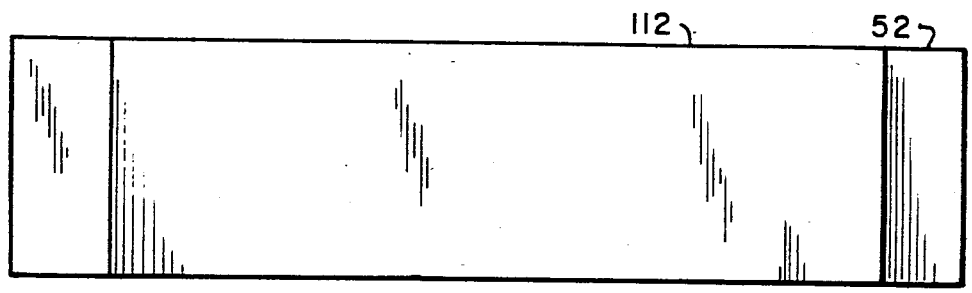
Figure 4C:
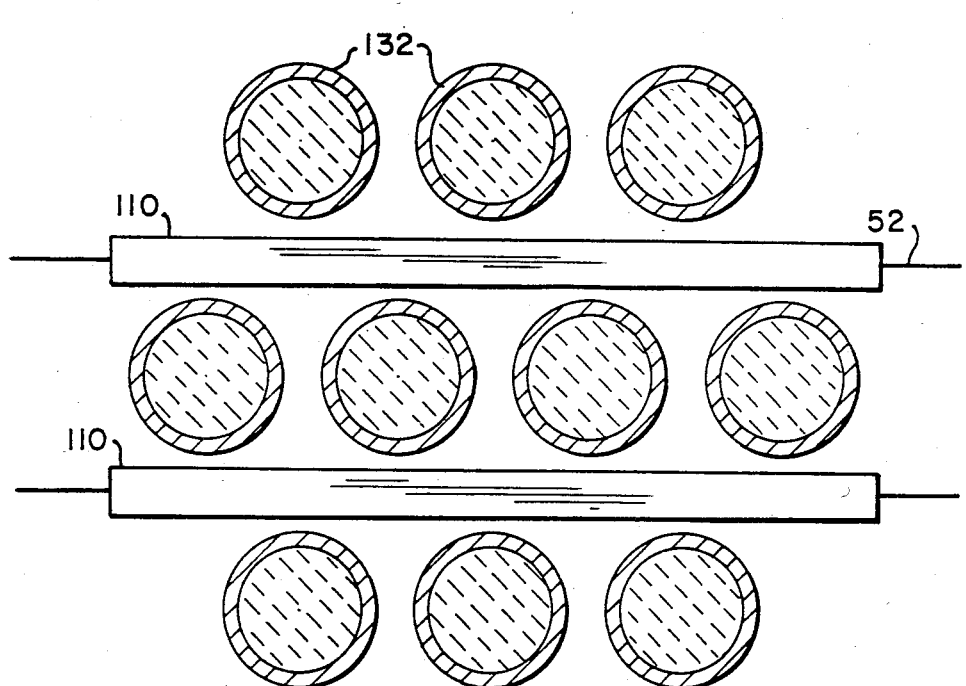

FIGS. 4a and b illustrate an alternative embodiment of the invention, where the burnup of a particular fuel rod of a fuel assembly is to be determined in water. The probe 110 in this embodiment is considerably simpler, in the form of a flat strip which is inserted between two rows of fuel rods in the fuel assembly. In FIG. 4, elements analagous in function to those illustrated in FIGS. 1-3, are identified by the same two digits with a prefix of "1". The probe 110 includes a flat, retangular container 112 within which is disposed a stainless steel support plate 116. The support plate 116 carries on each of its sides, a recording member 114 having an SSTR layer 118 coated with a fissile material 120. Particularly in this embodiment, where specific fuel rods are to be characterized, a gadolinium or other burnable poison strip 150 is sandwiched between two recording members 114, and may be carried on, or substitute for, the support plate 116. The probe is indexed so that on insertion its position relative to the fuel pins of an assembly is known. The gadolinium serves to shield the film from the neutron flux of pins in adjacent rows. Insertion of a twin detector as shown in FIG. 4c provides an accurate burnup profile for each fuel rod 132 in a row. The probe is conveniently handled by grasping tabs 52 projecting from the exterior of the container for remotely positioning the probe adjacent to the fuel to be characterized.

Figure 5:
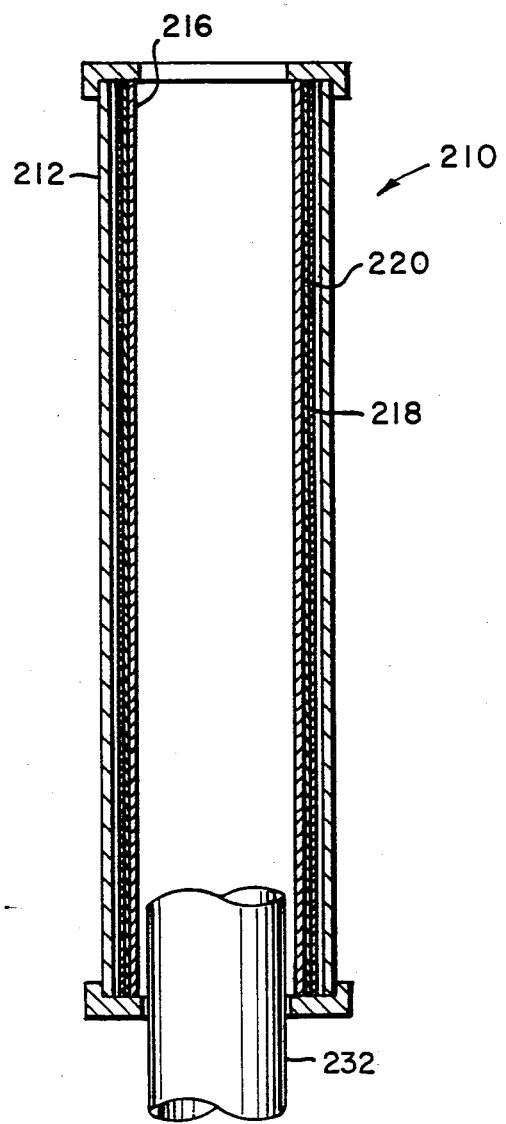
FIG. 5 is a schematic representation of another embodiment, suitable for measuring the burnup distribution of an individual fuel rod that has been removed from a fuel assembly.

A third embodiment is shown in FIG. 5, for use on a single fuel pin that has been removed from the fuel assembly. The configuration 210 is substantially the same as shown in FIGS. 1-3 except that the capsule 212 and central support tube 216 are open at the bottom and top to permit insertion of the fuel pin 232 into the support tube, as indicated. The resulting tracks produced on the SSTR layer 218 by the fissile coating 220 will profile the fuel pin burnup.

We claim:

1. Apparatus for measuring the burnup of nuclear fuel, comprising:
    an elongated, generally cylindrical metal containment tube;
    a central support tube removably supported within and substantially coextensive with the containment tube; and
    a generally cylindrical recording member carried by and surrounding the support tube, said member including a layer of solid state track recorder material adjacent to the tube and a coating of fissile material on the exterior of said recorder material.

2. The apparatus of claim 1 wherein the leading end of said containment tube is closed and the upper end is releasably sealed.

3. The apparatus of claim 2 wherein the support tube and recording member are spaced from the interior surface of the containment tube to provide an annulus therebetween, and further including means carried by the releasable seal for circulating coolant along a flow path including the interior of the support tube and said annulus.

4. The apparatus of claim 3 wherein said central support tube further includes a coating of thermal neutron absorbing poison between the support tube and the recording member.

5. The apparatus of claim 4 wherein said recording member is in the form of a plurality of axially separated segments having a total length substantially equal to the length of the nuclear fuel to be measured.

6. The apparatus of claim 1 further including a layer of thermal neutron absorbing poison interposed between the central support tube and the recording member.

7. The apparatus of claim 6 wherein the nuclear fuel is in the form of a fuel assembly having a hollow guide tube, and wherein the outer diameter of the containment tube is smaller than the inside diameter of said guide tube.

8. The apparatus of claim 1 wherein the containment tube is open at both ends.

9. The apparatus of claim 8 wherein said nuclear fuel is in the form of an individual fuel rod, and wherein the inner diameter of the support tube is larger than the outer diameter of said fuel rod.

10. Apparatus for remotely measuring the burnup of freshly irradiated nuclear fuel comprising:
    a containment capsule;
    a support member removably disposed within the containment capsule, said member carrying thereon a solid state track recorder material and a layer of fissile material adjacent said recorder material; and
    means on the exterior of the capsule adapted to be remotely grasped, for positioning the capsule adjacent to the fuel.

11. A method for measuring the burnup of nuclear fuel during refueling of a nuclear reactor, comprising:
    removing the fuel from the reactor;
    locating the fuel in an area accessible from above;
    lowering a measurement capsule into close proximity to the fuel, said capsule including a metal container, a central support member removably supported within the container, a recording member carried by the support member, said recording member including a layer of solid state track recorder material adjacent to the support member and a coating of fissile material on the exterior of the recorder material;
    positioning said capsule at a predetermined location for a period of time between approximately one hour and one day;
    removing the capsule from the fuel and recording the time interval during which the capsule was positioned in close proximity to the fuel;
    removing the support member and recording member from the capsule;
    removing the recording member from the support member,
    processing the recording member including the steps of removing the fissile coating, etching the solid state track recorder material, and counting the density of the number of tracks per unit area of track recorder material;

relating the neutron flux required to produce the track density counted, to the plutonium content of the fuel, to determine the fuel burnup.

12. The method of claim 11 wherein the fuel is in the form of a fuel assembly having a regular array of fuel rods and at least one guide tube, further including the step of inserting said measurement capsule into said guide tube a predetermined distance.

13. The method of claim 12 further including the step of maintaining a flow of coolant within the capsule to prevent overheating of the recording member.

14. The method of claim 13 wherein the fuel is in the form of an individual fuel rod, further including the step of lowering an open ended capsule onto the fuel rod to enclose at least a selected portion of the rod within the capsule.

15. The method of claim 11 wherein the capsule is in the form of a relatively flat plate and the fuel is arranged in a regular array, further including the step of positioning the capsule in a predetermined location between and parallel to two adjacent rows of fuel rods.

* * * * *